April 19, 1960 J. DIMEFF 2,933,665

DIRECTLY STRAINED, CAPACITANCE STRAIN GAGE

Filed April 5, 1956

INVENTOR
JOHN DIMEFF

BY

ATTORNEYS

United States Patent Office
2,933,665
Patented Apr. 19, 1960

2,933,665
DIRECTLY STRAINED, CAPACITANCE STRAIN GAGE

John Dimeff, San Jose, Calif.

Application April 5, 1956, Serial No. 576,503

3 Claims. (Cl. 317—246)

(Granted under Title 35, U.S. Code (1952), sec. 266)

The invention described herein may be manufactured and used by or for the Government of the United States of America for governmental purposes without the payment of any royalties thereon or therefor.

This invention relates to an electrical strain gage wherein the strain is applied directly to capacitor elements forming part of an electrical indicator circuit.

In the usual form of electric strain gage, use is made of a length of resistance wire which is applied in loop form on the workpiece surface and there cemented, so that the strain in the workpiece is imparted to the resistance wire, thereby modifying the wire resistance to a measurable degree and, thus, permitting a determination of the degree of strain. For certain uses the resistance type strain gage is undesirable, as for example in applications where temperature is sufficiently great to make inadequate the stability of the material of which the resistance strain wire is composed. Also, mounting of the resistance type strain gage on its support or workpiece where mounting area is restricted requires delicate application techniques, or in some applications, the electrical power dissipated in the wire results in prohibitive heating thereof.

The present invention, generally stated, consists in the use of a capacitor for the strainable unit of the gage, the capacitor elements being so applied with reference to the workpiece that they are subject to deformation primarily in planes parallel approximately to the plane including the deforming stresses.

An object of the invention therefore, is to provide a strain gage for measurement of workpiece strain which functions by change of capacity in an electric capacitor. A further object is to provide a capacitor type strain gage in which the capacity change is produced by area modification in the capacitor plate system. An additional object is to provide a capacitor type strain gage in which capacity change in the capacitor is brought about by elongation or contraction of the length of the capacitor plates in a line parallel to applied workpiece stresses. Still another object is to provide a capacitive type of strain gage which is independent of the electrical conductivity of the workpiece, being usable on either metal or insulator workpieces.

Other objects and many of the attendant advantages of this invention will be readily appreciated as the same becomes better understood by reference to the following detailed description when considered in connection with the accompanying drawings wherein.

Figure 1:
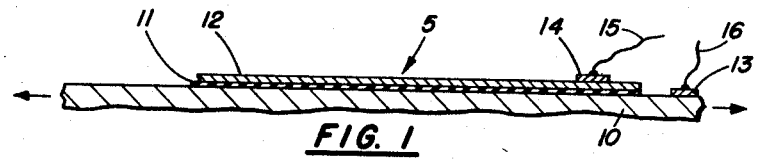
Fig. 1 is a longitudinal sectional view through the gage as applied to a metal workpiece.

Referring particularly to Fig. 1, a capacitor type strain gage 5 is shown in which the workpiece 10 is an electrically conducting material, such as metal. On the workpiece 10, which forms the base of the structure, a layer 11 of insulating material is deposited by any known means as by brushing, dipping, spraying, electrolytic deposition or deposit from a gas or vapor in a vacuous or restricted atmosphere. In some of these application methods involving depositions, subsequent film removal or cleansing is required to fashion the deposit to the form of a strip elongated in the direction of intended stress applications for test. The insulating medium, also, is not critical, the main requirement being a possession of appropriate dielectric properties for capacitor use and capability of tenacious attachment between the base and insulator. Where a bond is used, any of the resin type materials may be used, such as the thermoplastic resins including the copolymers of vinyl resins, polyvinyl acetate and polyvinyl chloride. Resins such as polyethylene may also be used or the polyvinyl butyral resins or the silicone compounds. Attachment between the dielectric and base, also, may result from the molecular coherence of the contacting dielectric-base surfaces, particularly in the case of spraying or deposition from gas or vapor suspensions, and Fig. 1 is intended to illustrate this form of attachment between the capacitor strips.

For capacitor use it is desirable that the dielectric strip thickness be small, as is well known in this art, the thickness varying with the material, the method of application and the use to which the gage is applied. For extreme strip thinness deposition and spray processes are effective; for thicker strips, formed dielectives of plastic, paper or mica are usable. With paper, for example, thickness of 0.00020 to 0.001 inch are used.

On the dielectric strip 11 there is placed a layer or strip of metal 12. This strip may be identical in form to that of the underlying dielectric strip and placed so as to have intimate contact with the dielectric, with firm cohesion therewith so that all stress impulses originating in the workpiece are transmitted effectively through the dielectric to the metal strip. This metal strip may be in the form of foil and may be attached by any known adhesive substance; such as the adhesive cement marketed as Duco by the Dupont de Nemours Corporation; or it may be deposited as a spray from a gas suspension; or it may be formed as a decomposition product from a vapor or disrupted compound in a quiescent or vacuous atmosphere. Other known means may also be used. A bonding substance also may be used to bring about adherence of the metal strip to the dielectric; or, in the case of spray or deposition from an enveloping atmosphere the adhesion may be due to the molecular coherence of the substances. The thickness of the metal strip will depend largely on the conditions of use, values varying from a few microns by vapor or gas deposition to one mil or larger.

Connections from the condenser metal plates to the electrodes, or terminals, of an outside circuit may be made simply by heat or chemically formed joints on the metal workpiece 10 at 13 and on the metal strip at 14, wire leads 15 and 16 being shown.

Figure 2:
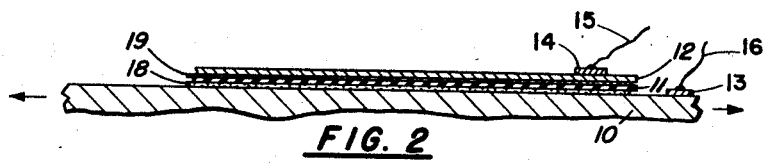
Fig. 2 is a longitudinal sectional view of a gage wherein the bonding material between the capacitor plates is indicated.

Fig. 1 illustrates strip attachment without separate bonding layers. In Fig. 2, the gage of Fig. 1 is modified by using bonds 18 and 19 between the dielectric 11 and workpiece 10 and between the dielectric 11 and metal strip 12, these bonds being independent of the adjoining strips, that is, a cement, a cellulose adherent, or a plastic bond. The requirement of the structure of Fig. 1 otherwise obtains that the gage with the bond applied be rigid with the workpiece so that any strain distortions in the workpiece are communicated in full to the gage.

Figure 3:
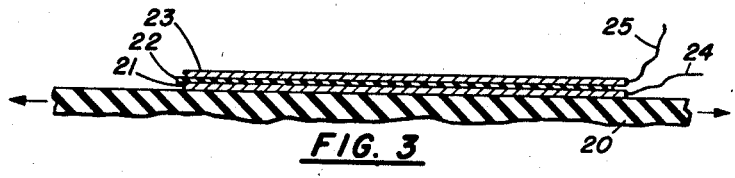
Fig. 3 is a longitudinal sectional view through a modified form of gage showing multiple capacitor plates for use on a non-metallic base, or on a metallic base in such instances as may require each element of the gage to be at a potential different from that of the metal workpiece.

In the case of a dielectric base, or of a metal workpiece whose electrical potential must be different than that of either plate of the gage, multiple capacitor plates are desirable as shown in Fig. 3. In this figure, on the dielectric base 20 is formed a layer 21 of conducting material, a superposed layer 22 of dielectric substance, and a layer 23 of conductor to form a capacitor pack or "sandwich," each layer being cemented firmly to the adjoining layer and the conductors 21 and 23 having separate outlet connections 24 and 25. In this manner, while the pack is rigidly integrated with the workpiece, it constitutes by itself an independent capacitor unit which may be readily connected into the test circuit. Obviously, additional capacitor cells may be added to that shown in Fig. 2, with the requirement that the assembled unit be rigid with the base plate 21 so that any strain imparted to plate 21 from the workpiece will be transmitted simultaneously to the unit as a whole.

Figure 4:
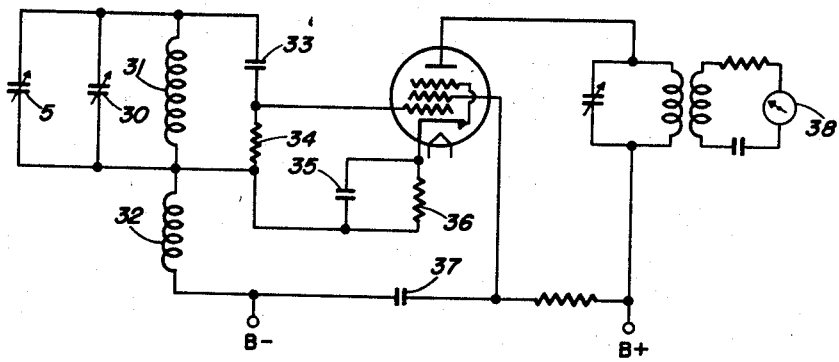
Fig. 4 is a diagram of a conventional circuit in which the strain gage may be used.

Fig. 4 illustrates diagrammatically a conventional electric indicator circuit in which the strain gage 5, as above described, may be used. The strain gage capacitor 5 is inserted as the fine capacity variable of a tank circuit of an electron-coupled oscillator, the coarse capacity variable being indicated at 30 and the inductance at 31 and 32, the grid connection including the capacitor 33 and resistor 34, and the cathode-suppressor grid connection including the capacitor 35 and resistor 36. The screen grid is grounded through capacitor 37 and the load circuit includes the meter 38 for indicating variations in capacitance in capacitor 5. The meter 38 may desirably be calibrated in units of strain.

In the use of the strain gage, it is applied at any desired test area of a workpiece where it is closely affixed to the area surface. The meter circuit is then connected to the strain gage terminals, the meter adjusted for accurate zero reading, the stress applied to the workpiece and appropriate readings of the meter taken. In the case of the usual metal workpiece, one electrode is connected to the workpiece adjacent the capacitor, as in Fig. 1. Where the workpiece is electrically non-conducting, the Fig. 3 type of gage is used. In either case, multiple pairs of capacitor elements may be used to augment the capacitive effect, particularly where the stress distortions are small.

It is pointed out that the capacitor configuration permits application of the gage in unusual areas and that the performance of the device is free of the disadvantages due to electrical heating of the equipment as in the resistance type gage, and that performance is dependent on the stability of the dielectric material rather than stability of the resistance wire and is therefore not affected by changes in electrical characteristics of metals with temperature. It is noted further, that the capacitor elements are in plate or strip form and lie in planes parallel to the plane including the applied stress. Consequently, the strain results in an area change of the capacitor elements, under tension the plates elongating and thinning, thus increasing the capacitance, the reverse action decreasing the capacitance.

Obviously many modifications and variations of the present invention are possible in the light of the above teachings. It is therefore to be understood that within the scope of the appended claims the invention may be practiced otherwise than as specifically described.

What is claimed is:

1. A strain gage of the capacitive type for application to a metal workpiece subject to strain, consisting of a flat metal strip, a combined spacing and attaching dielectric strip secured on one side to a side of said flat metal strip, said flat metal strip and said dielectric strip being in close contact over their entire surface areas, a layer of material forming a cohesive bond over the entire surface of the other side of said dielectric strip, and means for connecting said metal strip to one electrode of a strain indicating device and the workpiece to the other electrode of the strain indicating device.

2. A strain gage of the capacitive type for application to a metal workpiece, comprising a metal strip, means for connecting said strip to one terminal of a strain indicating device and the workpiece to the other terminal thereof, and a dielectric strip attached on one side of said metal strip over approximately the entire area of one side thereof, said dielectric strip including on its other side bonding material adapted to adhere throughout its area to a workpiece subject to strain, whereby the metal strip is deformed in direct an identical correspondence to the deformation suffered by the workpiece.

3. A strain gage of the capacitive type for application to a workpiece as defined in claim 2, said strain gage including additional alternate layers of insulator and metal strips stacked contiguously atop said first named metal strip perpendicular to the workpiece, each of said strips being bonded to the adjacent strip over the entire adjacent areas to form a flat sandwich configuration, and the lowermost insulator strip being bonded to the top of said first metal strip.

References Cited in the file of this patent

UNITED STATES PATENTS

| | | |
|---|---|---|
| 2,363,181 | Howland | Nov. 21, 1944 |
| 2,409,876 | Martin | Oct. 22, 1946 |
| 2,576,489 | Stovall | Nov. 27, 1951 |
| 2,589,983 | Blodgett | Mar. 18, 1952 |
| 2,621,276 | Howland | Dec. 9, 1952 |
| 2,654,060 | Stovall | Sept. 29, 1953 |